Nov 24, 1953 C. F. WEST 2,660,669

ELECTRON DISCHARGE DEVICE

Filed March 16, 1950 2 Sheets-Sheet 1

INVENTOR
CHARLES F. WEST
BY Elmer J. Gorn
ATTORNEY

INVENTOR
CHARLES F. WEST
BY [signature]
ATTORNEY

Patented Nov. 24, 1953 2,660,669

UNITED STATES PATENT OFFICE 2,660,669

ELECTRON DISCHARGE DEVICE

Charles F. West, Stoughton, Mass., assignor to Raytheon Manufacturing Company, Newton, Mass., a corporation of Delaware Application March 16, 1950, Serial No. 150,040

9 Claims. (Cl. 250—27)

This invention relates to information storage tubes, and more particularly to methods and means whereby information stored in memory tubes may be read out therefrom accurately and without dissipation of the stored information.

In memory tubes of the type which may be, for example, for computer information storage purposes, informational charges are stored on an insulating plate. Previous systems for reading said informational charges involved varying of the charges by means of an electron beam impinging thereon. After reading of the charge, said charge may be returned to its original stable position by a holding type electron beam. However, variation of the charge tends to spread said charge and, in addition, the requisite shifting of the potential between the cathode which supplies the reading beam and the storage surface introduces spurious signals into the output even when extreme care is taken in design of the circuitry involved.

This invention discloses a novel method of reading the stored informational charges wherein the reading beam is deflected cyclically across an informational charge at a high repetition rate, for example, several megacycles. Since charges may be stored on an insulating storage plate at one of two stable charge potentials with respect to a given reference, for example, the cathode of the reading gun, if the entire storage plate be maintained at cathode potential, then output signals will occur only for the stable condition which is positive with respect to the cathode and no output signals will be obtained for charges which are at the cathode potential. Since both charge potentials are stable with respect to the cathode of the reading gun, impingement on an electron stream from the reading gun on the storage surface at any point thereof will produce no change in magnitude or position of charges stored on the insulating storage surface.

Briefly, the mechanism of reading is as follows. Informational charge areas which are at cathode potential are of the same potential as the surrounding areas of the storage surface, and, therefore, an electron beam scanning from the surrounding area across the informational charge area will produce no change in the number of electrons reflected to adjacent conducting electrodes. However, if an informational charge storage area has a charge position thereon which is positive with respect to the surrounding area of the storage surface, electrons will impinge thereon causing emission of secondary electrons therefrom. The secondarily emitted electrons will be substantially entirely picked up by adjacent electrodes, while electrons which are directed at the area of the storage surface adjacent the informational charge area being at cathode potential will not have electrons from the reading gun impinge thereon. Rather, the electrons directed to said surrounding areas will be reflected thereby prior to striking said storage surface.

It has been found that many of these reflected electrons will be attracted back through the adjacent conducting electrodes and collected by other higher potential electrodes in the device. Thus, it may be seen that the number of electrons collected by the electrodes adjacent the storage surface will be greater when the electron beam is directed toward an informational charge storage area which is positive with respect to the cathode than when said electron beam is directed toward surrounding areas which are at cathode potential. Thus, scanning of the electron beam across an informational charge area which is positive with respect to the cathode and into the surrounding area which is at cathode potential and back again will produce a variation of the electron current in the adjacent electrodes which will bear a harmonic relationship to the scanning frequency of the electron beam.

This invention further discloses means, whereby cross modulation between the scanning deflection voltage applied to the beam deflection system and the output from the adjacent electrodes may be eliminated. This is accomplished by making the output circuit connected to the adjacent electrodes non-responsive to the scanning frequency. In particular, the output circuit may be tuned to a harmonic of the scanning frequency, for example, the second harmonic thereof.

Other and further advantages of this invention will become apparent as the description thereof progresses, reference being had to the accompanying drawings wherein.

Figure 1:
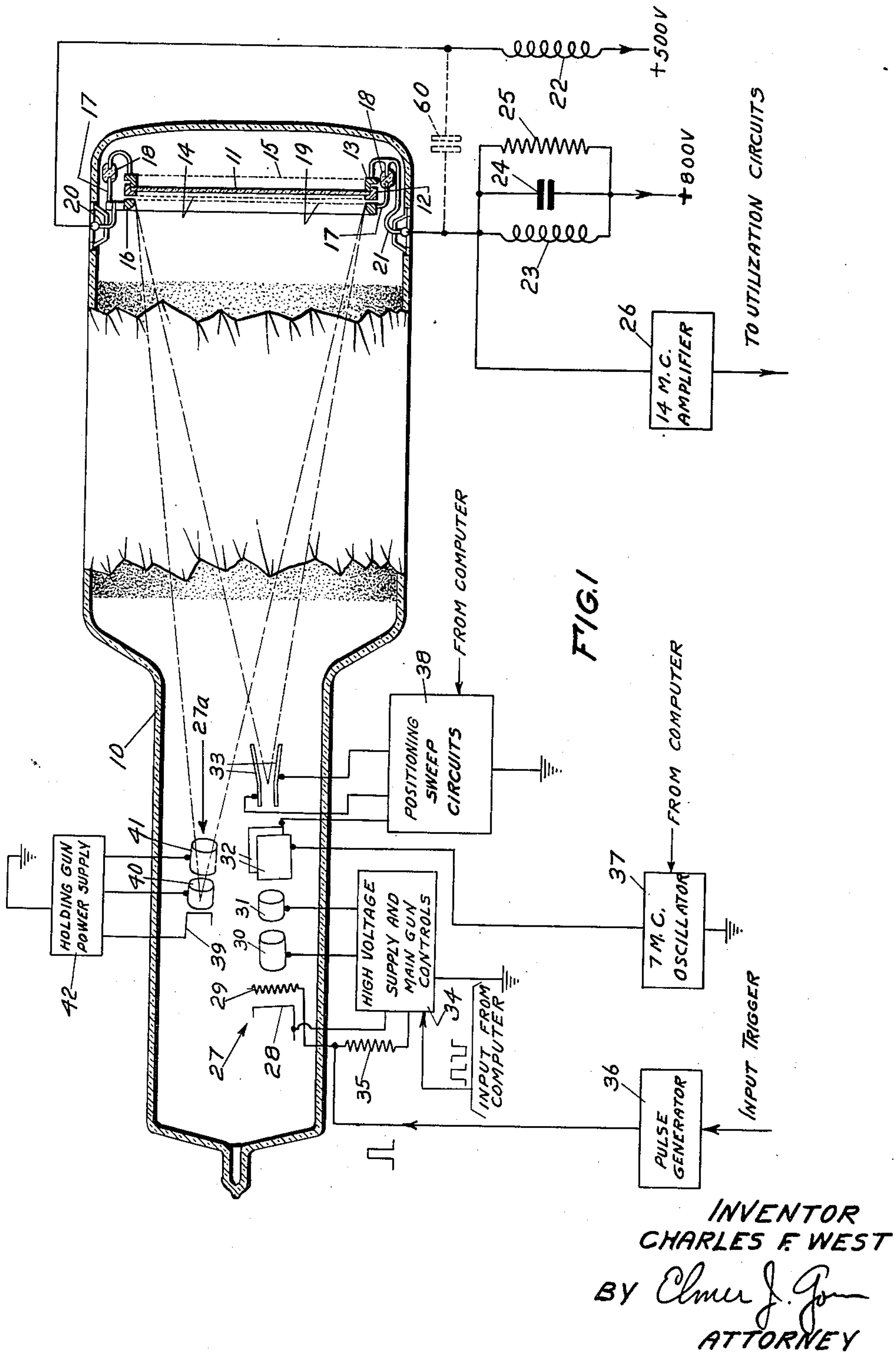
Fig. 1 illustrates a partially broken away, longitudinal, cross-sectional view of a memory tube in a functional block diagram of circuits utilizing said memory tube in accordance with this invention.

Referring now to Fig. 1, there is shown an electron discharge device comprising an evacuated envelope 10 having therein, adjacent one end thereof, a storage plate 11 which may be, for example, a flat piece of glass, and which, if desired, may be coated with a substance having the desirable secondary emission characteristics, such as calcium tungstate.

Storage surface 11 is supported, for example, at the edges thereof by a pair of metal rings 12 and 13 which firmly grip plate 11 and are held together by any desired means, such as welding. Ring 12 which is positioned on the side of plate 11 away from the adjacent end of the tube has attached thereto a metal screen 14 which may be, for example, of stainless steel having very small mesh size, for example, 200 by 200 meshes per inch. The ring 13 which is between the storage surface 11 and the adjacent end of envelope 10 may have, if desired, a mesh screen 15 attached thereto similar to mesh screen 14, thereby completely enclosing storage member 11 in a conducting shield which may be termed a Faraday cage. Positioned adjacent ring 12 is a conducting ring 16 which is supported therefrom by wire support elements 17, said rings 12 and 16 being insulated, for example, by glass beads 18 positioned between wire support elements 17. Ring 16 has a wire mesh screen 19 attached thereto adjacent mesh screen 14 and on the opposite side thereof from storage plate 11.

The entire assembly of elements 11 through 19 is supported by lead-in conductors 20 and 21, respectively, conductor 21 being conductively attached to rings 12 and 13, and conductor 20 being conductively attached to ring 16. Conductor 20 is connected through an R. F. load, for example, a choke 22 to a source of potential, for example, 500 volts. Lead-in 21 is connected through a tank circuit comprising an inductance 23, a capacitance 24 and a resistance 25, all in parallel to a source of potential of, for example, plus 800 volts. The output is taken from across the tank circuit and may be fed, for example, to an amplifier 26, and thence to the utilization circuit, for example, computer circuits.

Positioned in envelope 10 are two electron guns 27 and 27*a* which are aimed to direct electron beams against insulating storage member 11. The electron gun 27 comprises a cathode 28, a control grid 29, a focusing anode 30, an accelerating anode 31, horizontal deflection plates 32 and vertical deflection plates 33. These electrodes may be all of the standard construction well known in the cathode ray tube art. Electrodes 28 and 29, 30 and 31 have suitable potentials applied thereto from a negative high voltage power supply 34, the grid 29 having a load resistor 35 interposed between said grid and power supply 34. The gun 27 is turned on by a positive pulse applied to grid 29 across resistor 35 from a pulse generator 36 which is triggered by an input pulse whenever it is desired that an electron beam emit from gun 27. One of the horizontal deflection plates 32 is connected through an oscillator 37 having, for example, a frequency of seven megacycles. The other of the deflection plates 32 is connected to the positioning sweep circuits 38. Vertical deflection plates 33 are also connected to sweep circuits 38. These sweep circuits may be of the standard type which are fed voltage waves from the computer to position the beam from gun 27 which is adjusted to fine definition on any desired area of the screen 11. The amplitude of the seven megacycle oscillations fed to the horizontal deflection system 32 is sufficient to cause a deflection of the beam, for example, on the order of two to four times the beam diameter. Oscillator 37 may be energized as desired by input signals from a computer system.

Gun 27*a* comprises a cathode 39, a focusing electrode 40 and an accelerating electrode 41. These electrodes are fed from a power supply 42 whose potentials are such that gun 28 is focused to spray an even stream of electrons over the entire surface of storage area 11 which is presented to gun 27*a*.

Figure 2:
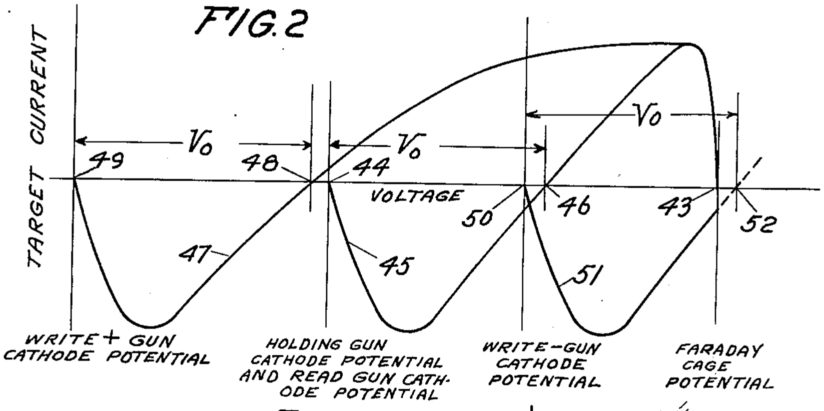
Fig. 2 illustrates a graph demonstrating a method of storing informational charges on the storage surface, holding said charges on said storage surface, and reading said charges from said storage surface.

Referring now to Fig. 2, there will be described one method of operation of the system shown in Fig. 1. In this description, it is assumed that the potential of the Faraday cage remains substantially constant, for example, at 400 volts, as is illustrated by point 43. In the graph of Fig. 2, voltage is plotted along the ordinate, and target current is plotted along the abscissa. With the cathode 28 positioned negative with respect to point 43, for example, at zero potential, as shown by point 44, curve 45 illustrates target current for various potential differences between cathode 39 and an area of target 11. When the area of target 11 is at the potential of cathode 39, no secondary electrons will be emitted from the target 11, and all incident electrons are reflected therefrom, and, therefore, target current is zero, as indicated at point 44. As the area of target 11 is raised to a more positive potential than cathode 39, electrons strike the target 11 and a lesser number are emitted therefrom by secondary emission, and the net current onto target 11 becomes negative. Increase of the potential of the area of target 11 still further causes the number of electrons emitted from target 11 to exceed the number of electrons impinging thereon, and curve 45 crosses the zero target current line at a point indicated at 46 after which the net current onto member 11 becomes positive. Further increase of the area potential of target 11 produces, at a voltage which is substantially equal to the voltage of the Faraday cage, a point where electrons emitted by secondary emission which were previously attracted back to target 11 are now attracted to the Faraday cage, such that the net current onto target 11 again becomes zero, as shown by point 43.

Since target 11 is an insulator, a deficiency of secondary electrons escaping from an area of target 11 over the number of electrons impinging thereon, as shown by the section of the curve 45 between points 44 and 46, will cause the charge on the storage surface to become more negative until point 44 is reached, while, if an excess of secondary emission electrons is present, the charge becomes more positive until point 43 is reached. Thus, it may be seen that two stable potentials, as illustrated by points 44 and 43, may occur on discrete areas of target surface 11, and, once an area of target 11 has been charged to one of points 44 or 43, it will remain there during the action of holding gun 27*a*.

The action of gun 27*a* will behave similar to gun 27 for a similar potential difference between the Faraday cage and the cathode 39 thereof.

For this potential, the curve of secondary emission vs. voltage for gun 27 will coincide with curve 45 of gun 27*a*. However, since the beam of gun 27 is concentrated on a small area which is determined by the voltage from sweep circuits 38, the charging action of gun 27 will dominate the action of gun 27*a* in said area. Therefore, the holding gun 27*a* may remain energized at all times without interfering with the operation of gun 27. Gun 27 is used for both writing the information on the target electrode 11 and reading the information therefrom. In order to store informational charges on screen 11 which have a positive charge potential with respect to the cathode 39 of holding gun 27*a*, the cathode 28 of gun 27 is driven negative, for example, in response to input pulses from the computer to voltage supply 34 by an amount greater than $V_0$, where $V_0$ is designated as the voltage between the points 44 and 46 of curve 45. This creates a new curve 47, the negative half of which conforms exactly with the negative half of curve 45, but which is displaced therefrom by a voltage somewhat greater than $V_0$. Curve 47 then crosses the zero current axis at a point 48 which is somewhat more negative than point 45, and again crosses the zero axis at a point which is negative with respect to point 44 by an amount somewhat greater than $V_0$, as shown by numeral 49. After crossing the axis at point 48 and progressing in a positive direction, curve 47 eventually coincides with curve 45 and returns to the zero axis at substantially the Faraday cage potential, as shown by point 43. Since curve 47 of gun 27 will dominate the curve of holding gun 27*a*, the area upon which the beam from gun 27 impinges will always fall within the positive current region of curve 47, and, therefore, this area will be driven to the potential of point 43 when grid 29 is driven sufficiently positive to cause a beam to emit from gun 27.

If it is desired to store an informational charge on target 11 having the same potential as that of cathode 39, the cathode 28 of gun 27 is positioned positive with respect to point 44 by an amount somewhat less than $V_0$, as shown by point 50.

The voltage of the Faraday cage is such that the negative half of the curve 51 which is similar to the negative halves of curves 47 and 45 would cross the zero current axis at a potential greater than the Faraday cage voltage, as shown by point 52. Since any point on target 11 will be below the potential of point 52, triggering of grid 29 will cause the area upon which the beam from gun 27 impinges to delevop a charge sufficient to bring that area to a potential coincident with point 50. Cessation of the action of gun 27 by driving grid 29 negative will then cause that area to charge along curve 45 under holding gun action to point 44 since point 50 lies within the negative current range of holding gun curve 45.

Thus, it may be seen that by varying the potential between cathode 28 and Faraday cage either positive or negative, informational charges may be stored on target 11. If it is assumed that the holding gun originally held the target at the cathode potential of the holding gun, as shown by point 44, then informational charges which are positive will be positive with respect to the area of the target surrounding the charge, while, if the charges are negative, they will be of the same potential as the area surrounding the charge. Similarly, the entire area of the storage plate could be originally held at substantially the Faraday cage potential by the holding gun action. Positive informational charges would then be at the same potential as their surrounding areas, while negative informational charges would be at a considerably lower potential than their surrounding areas.

Figure 3:
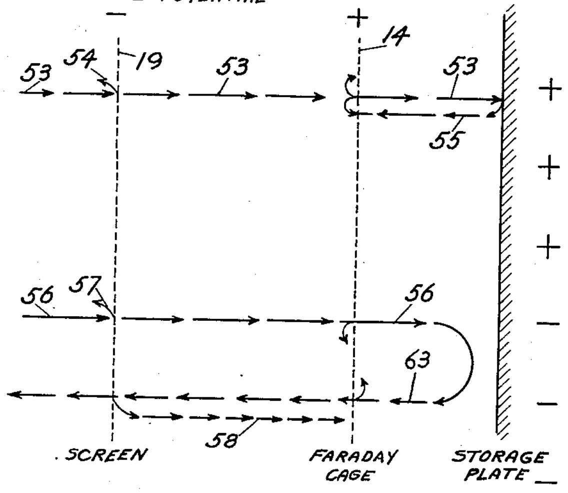
Fig. 3 illustrates a magnified view of the storage surface, and adjacent electrodes demonstrating the difference in electron paths for positive and negative informational charge potentials on said storage surface.

Referring now to Fig. 3, there is illustrated the action of electrons impinging on the target 11 and adjacent electrodes when the gun 27 has its cathode positioned at point 44 with respect to the Faraday cage. The electron stream, as shown by arrows 53, which is directed towards a positively charged area of the target 11 will behave as follows. The major part of the electron stream will pass through screen 19 with a small portion thereof impinging on the wires and causing a relatively small amount of secondary emission, as shown by arrow 54. The electron stream 53 passes through screen 14 with a small amount thereof impinging upon screen 14 and causing secondary emission which is reattracted to screen 14. The remainder of the beam impinges upon the target 11 and causes secondary emission therefrom which is attracted to screen 14, with the result that the net flow of electrons to target 11 is zero.

When an electron stream is directed towards a negatively charged surface, as for example, stream 56, a small part impinges upon screen 19 which causes secondary emission 57 of the same amount as secondary emission 54 caused by stream 53. Stream 56 passes through screen 14 with a small portion thereof impinging thereon which causes secondary emission which is reattracted to screen 14. Stream 56 then approaches target 11, but, since target 11 is at the potential of the cathode from which the electrons originated, the electrons are decelerated to a zero value, prior to impingement on target 11, and, therefore, no secondary electrons are emitted from target 11, and the electrons of stream 56 are attracted back toward screen 14, as shown, for example, by arrows 63. Stream 63 passes through screen 14 with a small portion impinging thereon, causing secondary emission which is reattracted to screen 14. Beam 63 then passes through screen 19 with a portion thereof impinging on screen 19 and causing secondary emission which is attracted back to screen 14. The remainder of beam 63 passes through screen 19 and is attracted to other higher potential electrodes in the device, for example, the accelerating anode deflection plates or shield members.

Comparing beams 53 and 56, it may be seen that both cause the same initial current in screen 19 by impingement thereon and secondary emissions 54 and 57 therefrom when they first pass through screen 19. Both cause the same current in screen 14 when they first pass through screen 14 by partial impingement thereon and reattraction of secondary emission thereto. Both cause the same zero current flow onto storage plate 11 since the secondary electrons 55 escaping from screen 11 are exactly equal to the number of electrons from beam 53 impinging thereon. However, substantially all of the secondarily emitted electrons 55 return to screen 14, while a large portion of the reflected beam 63 passes through screen 14. The result is a difference in current flow to screen 14. In addition, beam 63 upon passing through screen 14 also passes through screen 19 with only a minor portion impinging thereon and causing secondarily emitted electrons 58 which are reattracted to screen 14.

Since there is a large stray capacitance between screens 19 and 14, as indicated by condenser 60 in Fig. 1, the screens 19 and 14 may be considered as unitary when the scanning frequencies used are relatively high as in the present case. It may be seen that the total currents to the screens 14 and 19 are greater from the beam 53 than from the beam 56 since a portion of the beam 56 returns back to the other electrodes of the tube. Thus, if the cathode 28 of gun 27 is positioned at a potential 44 and a particular area having, for example, a positive informational charge thereon is scanned by energization of the oscillator 37, the beam will move from a target area having a positive charge, and hence a relatively high beam current to screens 14 and 19 to the surrounding target area which is at cathode potential, and, therefore, a relatively lower electron current to screens 14 and 19. Since the beam will be scanned across a positively charged area and into the surrounding area on each side thereof, a current pulse will be produced during every traverse across the positive area, and hence two current pulses will occur per cycle of scanning. Thus, an output signal which is the second harmonic of the scanning frequency may be obtained from screens 19 and 14. As shown here, screen 14 feeds a tank circuit which is resonant to twice the scanning frequency, while screen 19 feeds a high impedance choke 22. However, for high frequency purposes, due to the action of stray capacitance 60, screens 19 and 14 may be considered as connected together with choke 22 in parallel with the tank circuit 23, 24 and 25. The value of resistor 25 is such that sufficient band pass may be developed to pass pulses of the second harmonic energy as the gun 28 is turned on and off during positioning over different informational charged storage areas. Obviously, when the charge area is at cathode potential, it has the same charge as the surrounding area, and hence no signal output will be obtained. Thus, if an area is scanned and a signal output is obtained, it is known that a positive charge is stored thereon, while if no output signal is obtained, it is known that a negative potential is stored thereon.

Figure 4:
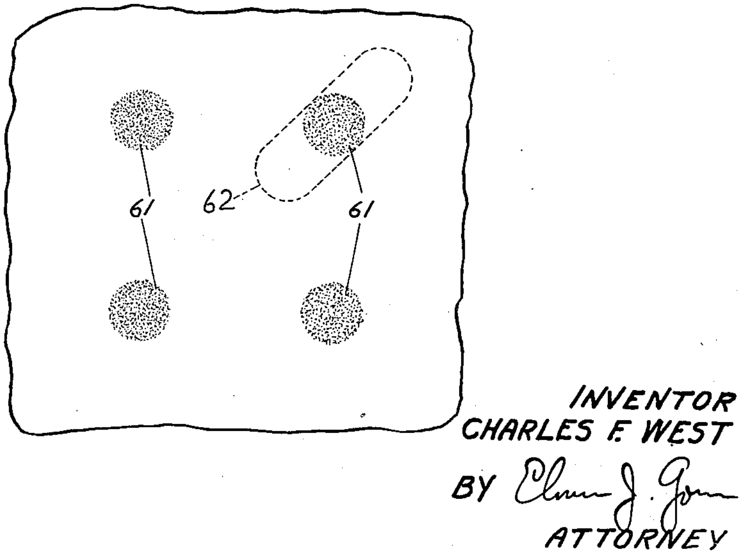
Fig. 4 illustrates a portion of said storage surface showing one method of spacing the informational charge areas on the storage surface.

Referring now to Fig. 4, there is shown a storage pattern wherein informational charges 61 are stored on a plate. The distance between the centers of the charges is made, for example, three times the diameter of the charge areas, thus insuring adequate separation between the charges. During reading, a particular charge is scanned with the motion of the beam moving, for example, two to four times the diameter of the charge area, as shown at 62. Since the output of the screens is a different frequency from the scanning frequency, cross-talk between the scanning frequency beam deflection system and the output, due to stray capacitance coupling therebetween, is eliminated. Further, since there is no change in the charge on the target during reading, the informational charges are preserved.

In addition, since the target electrode and the screens adjacent thereto are spaced a considerable distance from any other electrode structure, capacitive loading thereof may be made very small, thereby permitting very rapid read-out of information stored. For example, individual informational charges have been read in less than a microsecond. Since the cathode of the gun remains constant with respect to the Faraday cage during reading, spurious signals previously encountered due to variation of this potential are eliminated.

This completes the description of the particular embodiment of the invention described herein. However, many modifications thereof will be apparent to persons skilled in the art without departing from the spirit and scope of this invention. For example, different potentials and electrode structures could be used adjacent the target electrode, and harmonics other than the second harmonic of the scanning frequency could be used for the output signal. A backing plate could be used in place of the screen 15, and the device is not necessarily limited to computer applications. Therefore, applicant does not wish to be limited to the particular details of the invention illustrated herein except as defined by the appended claims.

What is claimed is:

1. An information storage device comprising a storage member having a storage surface, means for storing informational charges on said surface, means for cyclically scanning a portion of said surface, and output means tuned to a harmonic of the scanning frequency of said scanning means.

2. An information storage device comprising a storage member having a storage surface, means for storing informational charges on said surface, said storing means comprising an electron beam forming structure, means for reading said stored charges comprising means for cyclically scanning a portion of said surface, and output means tuned to a harmonic of the scanning frequency of said scanning means.

3. An information storage device comprising a storage member having a storage surface, means for storing informational charges on discrete areas of said surface, and means for reading said stored charges comprising means for cyclically scanning one of said areas whereby an output signal is produced having a frequency harmonically related to the scanning frequency of said scanning means.

4. An information storage device comprising a storage member having a storage surface, charge storing means comprising an electron gun, elemental areas of said surface having, respectively, a plurality of possible equilibrium charge potentials with respect to the cathode of said gun, and means for reading said stored charges comprising means for cyclically scanning a portion of said surface.

5. An information storage device comprising a storage member having a storage surface, elemental areas of said surface having, respectively, a plurality of possible equilibrium charge potentials, and means for reading said charge potentials comprising means for cyclically scanning a portion of said surface.

6. An information storage device comprising a storage member having a storage surface, elemental areas of said surface having, respectively, a plurality of possible equilibrium charge potentials, means for reading said charge potentials comprising means for cyclically scanning a portion of said surface, and output means tuned to a harmonic of the scanning frequency of said scanning means.

7. An information storage device comprising a storage member having a storage surface, elemental areas of said surface having, respectively, a plurality of possible equilibrium charge potentials, and means for reading said charge potentials comprising means for cyclically scanning a portion of said surface whereby an output signal is produced having a frequency harmonically related to the scanning frequency of said scanning means.

8. An information storage device comprising a storage member having a storage surface, elemental areas of said surface having, respectively, a plurality of possible equilibrium charge potentials, means for cyclically scanning a portion of said surface, and output means tuned to a harmonic of the scanning frequency of said scanning means whereby an output signal is produced having a frequency harmonically related to the scanning frequency of said scanning means.

9. An information storage device comprising a storage member having a storage surface, means for storing informational charges on said surface, means for reading said stored charges comprising means for cyclically scanning a portion of said surface, and output means receptive to a frequency which is the second harmonic of the scanning frequency of said scanning means.

CHARLES F. WEST.

References Cited in the file of this patent

UNITED STATES PATENTS

| Number | Name | Date |
|---|---|---|
| 2,185,135 | Schlesinger | Dec. 26, 1939 |
| 2,225,330 | Cage | Dec. 17, 1940 |
| 2,245,364 | Riesz et al. | June 10, 1941 |
| 2,420,846 | Strutt et al. | May 20, 1947 |
| 2,454,410 | Snyder, Jr. | Nov. 23, 1948 |
| 2,460,093 | Law | Jan. 25, 1949 |
| 2,464,420 | Snyder, Jr. | Mar. 15, 1949 |
| 2,470,875 | Snyder, Jr. | May 24, 1949 |
| 2,481,458 | Wertz | Sept. 6, 1949 |
| 2,501,637 | Snyder, Jr., et al. | Mar. 21, 1950 |
| 2,503,949 | Jensen et al. | Apr. 11, 1950 |
| 2,527,632 | Graham | Oct. 31, 1950 |
| 2,527,652 | Pierce | Oct. 31, 1950 |
| 2,535,817 | Skellett | Dec. 26, 1950 |
| 2,538,836 | Jensen | Jan. 23, 1951 |
| 2,547,638 | Gardner | Apr. 3, 1951 |
| 2,548,789 | Hergenrother | Apr. 10, 1951 |
| 2,581,612 | Thompson | June 8, 1952 |
| 2,582,977 | Ferguson | Jan. 22, 1952 |